March 22, 1927. 1,621,972
W C. DARBY
ANTIGLARE SHIELD FOR MOTOR VEHICLES AND THE LIKE
Filed Feb. 1, 1926
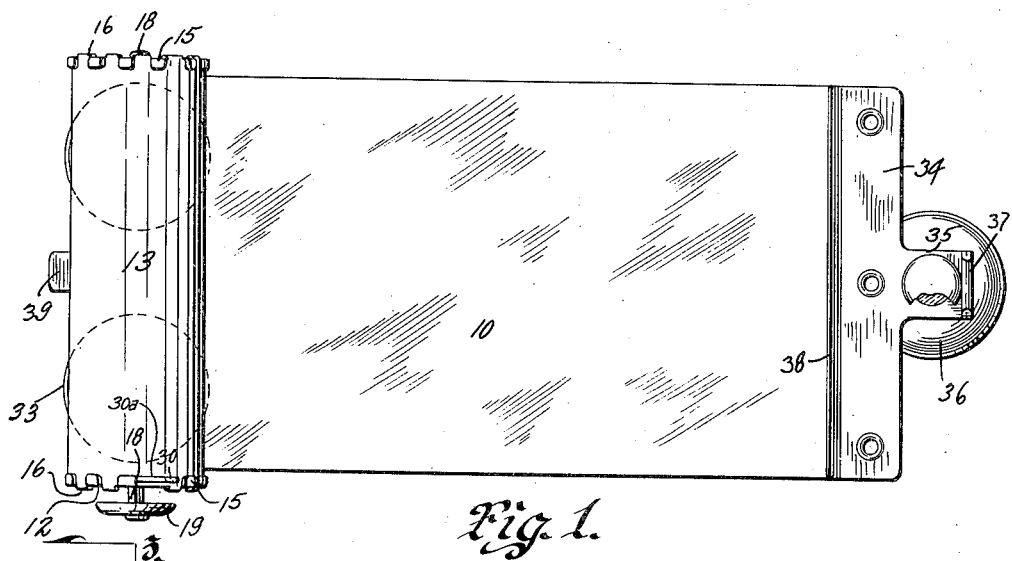
Fig. 1.
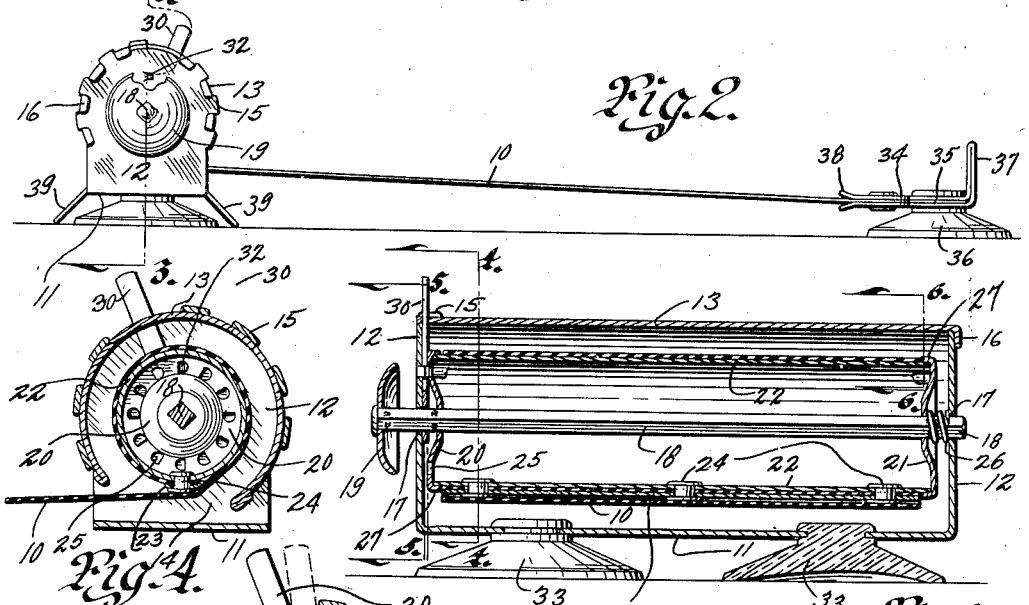
Fig. 2.
Fig. 4. Fig. 3.
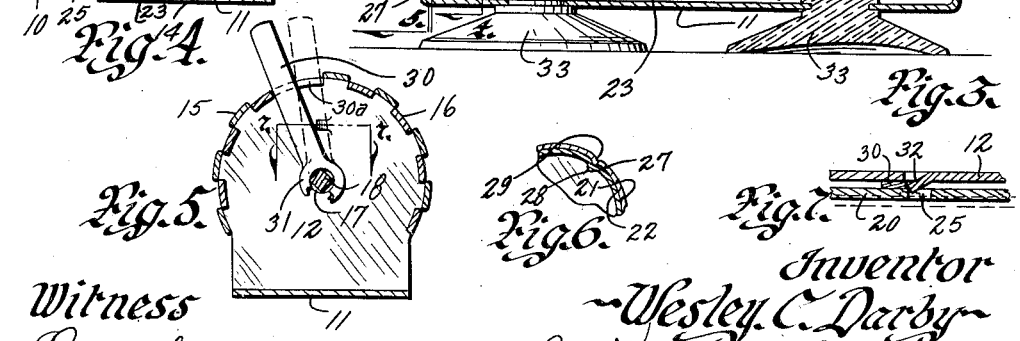
Fig. 5. Fig. 6. Fig. 7.
Witness
Inventor
Wesley C. Darby
by Bair & Freeman Attorneys Patented Mar. 22, 1927.

1,621,972

UNITED STATES PATENT OFFICE.

WESLEY C. DARBY, OF DES MOINES, IOWA.

ANTIGLARE SHIELD FOR MOTOR VEHICLES AND THE LIKE.

Application filed February 1, 1926. Serial No. 85,206.

The object of my invention is to provide an anti-glare shield of very simple and inexpensive construction, which can be readily and easily mounted detachably on the windshield of a motor vehicle or removed therefrom.

More particularly, it is my object to provide an anti-glare shield of the kind described, comprising a flexible substantially transparent colored strip of pyralin celluloid or the like connected with a roller in a suitable casing, which roller and casing are of novel structure.

Another purpose of my invention is to provide novel means for mounting the roller in the casing and operatively connecting it therewith.

With these and other objects in view, my invention consists in the construction, arrangement and combination of the various parts of my anti-glare shield, whereby the objects contemplated are attained, as hereinafter more fully set forth, pointed out in my claims, and illustrated in the accompanying drawings, in which:

Figure 1 is a front elevation of my improved anti-glare shield as it appears on a windshield.

Figure 2 is an end view of the same.

Figure 3 is a detail, sectional view through the casing and roller taken on the line 3—3 of Figure 2.

Figure 4 is a detail, sectional view taken on the line 4—4 of Figure 3.

Figure 5 is a similar view taken on the line 5—5 of Figure 3.

Figure 6 is a detail, sectional view taken on the line 6—6 of Figure 3; and

Figure 7 is a detail, sectional view taken on the line 7—7 of Figure 5.

It is well known that under certain conditions, it is desirable on the part of an automobile driver to be able to shut out the substantially direct rays of sunlight and to shut out the glare of the headlights of approaching vehicles. Likewise it is desirable to have an anti-glare device which can be quickly and easily mounted or taken off the windshield.

Another desirable feature of an anti-glare device is the quality of adjustability to any position on the windshield desired and for the purpose of covering any desired area of the windshield in any location thereon.

These results I have largely been able to attain with my improved anti-glare device, which consists of a sheet of pyralin or the like indicated generally in the accompanying drawings by the reference character 10, which is connected with a roller at one end and is adapted to be wound or unwound from the roller. This roller is mounted in a suitable casing.

The casing has what may be called a bottom wall indicated generally by the reference character 11, having at its ends the substantially parallel projecting end members 12.

Mounted between the ends 12 is the cylinder 13 having at its bottom portion a longitudinal slot 14, extending from end to end and of substantial width as shown in Figure 4.

The end members 12 are provided with a series of tongues 15, which are bent over the ends of the cylinder 13, as shown for instance in Figures 1 and 2, and the cylinder 13 is provided with similar tongues 16, which are staggered with relation to the tongues 15 and are bent over the end members 12.

In the end members 12 are suitable holes 17, which receive the ends of a shaft 18. On the shaft 18 outside the casing is fixed a bell-shaped member 19 adapted to serve as a handle or head for rotating the shaft.

On the shaft 18 inside the cylinder 13 is a roller or drum. The roller consists of end members 20 and 21, which receive and hold between them the cylinder or roller member 22.

The end of the strip 10 of transparent material is held adjacent to the roller member 22 by means of a metal strip 23, and is fastened in place by means of rivets 24. The strip 10 may then be wound on the roller.

The end 20 is provided with a series of holes 25 arranged in a circle. Between the end 21 and the adjacent end 12 of the main casing, a coil spring 26 is mounted on the shaft 18 for yieldingly tending to hold the roller at the left-hand limit of its movement in the casing, as shown in Figure 3.

The roller is permitted only slight longitudinal movement in the casing because of its size.

The end members 20 and 21 have the flanges 27 (see Figure 3) receiving the ends of the roller 22 and the flanges and the roller are connected together by bending or punching inwardly the coacting portions 28 and 29, as illustrated in Figure 6.

This structure causes the roller 22 and the end members 20 and 21 to rotate together.

A lever 30 has one end loosely mounted on the shaft 18 as at 31 (see Figure 5) and projects through a circumferentially elongated slot 30ᵃ in the casing 13.

The end member 12 of the main casing adjacent to the end member 20 of the roller is of somewhat resilient material and has a tongue 32 sprung inwardly in such position as to press against the end 20, and when the roller is in certain positions, to enter the respective holes 25.

When rotated in one direction, for example anti-clockwise, from its position shown in Figure 4, the end 20 of the roller will slide over the tongue 32. When rotated in the opposite direction, the tongue 32 will stop the rotation of the roller, when it enters one of the holes 25.

The handle 30 can, however, be swung to clear the tongue 32, thus forcing the roller endwise, or be swung to position shown by dotted lines in Figure 5, where it will either press the tongue 32 outwardly or slide the roller far enough away from the adjacent end 12 toward the opposite end of the casing to cause the roller to clear the tongue 32.

Mounted on the bottom member 11 are compression cups 33 of ordinary construction.

The free end of the strip 10 is bound between two portions or strips 34 of a metal binder having the narrower projecting portions 35 to which another compression cup 36 is secured. The portions 35 terminate in the folded over projecting handle member 37.

It will be noted that the edges of the members 34 are bent slightly away from each other as at 38.

On the bottom member 11 at its opposite sides are projecting tongues 39, which when the compression cups 33 are secured to a smooth piece of glass or the like help to steady the casing.

In the actual use of my anti-glare device, the strip 10 is wound on the roller until the device is to be placed on the windshield or the like.

When it is desired to use the device the compression cups 33 are slightly wet around the edges, and are then pressed against the windshield in the ordinary way. This secures the casing to the windshield.

The lever 30 is then manipulated to render the tongue 32 inoperative, and the strip 10 is withdrawn from the casing and its outer end is fastened to the windshield by means of the compression cup 36.

The lever 30 may be moved to inoperative position just before the cup 36 is secured to the windshield to permit the tongue 32 to engage with one of the holes 25 for locking the roller against rotation.

It will be seen that my improved anti-glare shield has a number of advantages.

The strip 10 is wound on a roller when not in use and is thus protected. When in use and drawn out from the casing, it is not subjected to spring tension, and there is therefore not the tendency to pull the compression cup 36 loose from the windshield, which would exist if the roller were under spring tension.

There is no danger of accidentally unrolling the strip 10 when it is wound on the roller, because the roller can be secured in its position with the strip wound up by means of the tongue 32.

The entire device may be mounted on the windshield in any position desired thereon, and the strip can be pulled out as far as desired for covering as much of the windshield as seems desirable under the circumstances.

By providing the roller, which may be locked in any position and eliminating the use of a spring in connection therewith for winding up the roller, I have avoided one of the objectionable features to the use of a roller.

My device is such that it does not easily get out of order and is of long life.

It is simple and inexpensive of construction and when not in use occupies a relatively small space.

It is noted that the shaft is rotatably mounted in the ends of the casing and is capable of slight sliding movement therein, and that the roller is non-rotatably mounted on the shaft.

Changes may be made in the details of the construction and arrangement of the various parts of my device without departing from the real spirit and purpose of my invention, and it is my intention to cover by my claims any modified forms of structure or use of mechanical equivalents, which may be reasonably included within their scope.

I claim as my invention:

1. In a device of the class described, a casing having a longitudinal slot therein, a shaft mounted in the ends of said casing for rotation, a roller fixed on said shaft in said casing, said shaft being able to slide in the ends of the casing, a spring on the shaft between the roller and one end of the casing, the one end of said roller having a series of holes, a tongue projecting from the adjacent end of the casing and adapted to coact with said holes, a movable member adapted to be moved to position between the tongue and the roller, and a transparent strip mounted on said roller.

2. In a device of the class described, a casing having a longitudinal slot therein, a shaft rotatably mounted in the ends of said casing, a roller non-rotatably mounted on said shaft in the casing, means for yieldingly pressing the roller toward one end of the casing, and coacting means on said end of the casing and on the adjacent end of the roller for holding the roller in a variety of rotated positions, and a transparent strip wound on said roller.

3. In a device of the class described, a casing having a longitudinal slot therein, a shaft rotatably and slidably mounted in the ends of said casing, a roller non-rotatably mounted on said shaft in the casing, means for yieldingly pressing the roller toward one end of the casing, and coacting means on said end of the casing and on the adjacent end of the roller for holding the roller in a variety of rotated positions, said means comprising a tongue projecting inwardly from the casing, and a series of holes in one end of the casing adapted to coact with and receive said tongue.

4. In a device of the class described, a casing having a longitudinal slot therein, a shaft rotatably and slidably mounted in the ends of said casing, a roller non-rotatably mounted on said shaft in the casing, means for yieldingly pressing the roller toward one end of the casing, and coacting means on said end of the casing and on the adjacent end of the roller for holding the roller in a variety of rotated positions, said means comprising a tongue projecting inwardly from the casing, a series of holes in one end of the casing adapted to coact with and receive said tongue, and a movable member adapted in one position to render the coaction between the tongue and holes ineffective.

5. In a device of the class described, a casing having a longitudinal slot therein, a shaft rotatably and slidably mounted in the ends of said casing, a roller non-rotatably mounted on said shaft in the casing, means for yieldingly pressing the roller toward one end of the casing, and coacting means on said end of the casing and on the adjacent end of the roller for holding the roller in a variety of rotated positions, said means comprising a tongue projecting inwardly from the casing, a series of holes in one end of the casing adapted to coact with and receive said tongue, and a movable member adapted in one position to render the coaction between the tongue and holes ineffective, comprising a lever loosely mounted on said shaft and projecting through said casing, said casing having an elongated slot for receiving the lever, said lever being adapted to be moved to position between the tongue and the roller, and a handle on said shaft outside the casing.

Des Moines, Iowa, January 22, 1926.

WESLEY C. DARBY.